Patented Sept. 2, 1947

2,426,913

UNITED STATES PATENT OFFICE 2,426,913

POLYMERIC ALLYL-TYPE COMPOUNDS AND DERIVATIVES THEREOF

David E. Adelson and Harold F. Gray, Jr., Berkeley, Calif., assignors to Shell Development Company, San Francisco, Calif., a corporation of Delaware No Drawing. Application October 16, 1943,
Serial No. 506,618

14 Claims. (Cl. 260—636)

This invention relates to the production of polymeric allyl-type halides by the polymerization of allyl-type halides, and to the production of the corresponding polymeric allyl-type alcohols and derivatives thereof.

The polymerization of allyl-type halides under the influence of actinic light, or of peroxides, is known. However, the reaction is too slow to be more than of academic interest. Polymerization under more rigorous conditions, such as in the presence of a volatilizable halide catalyst of the Friedel-Crafts type, is faster but the products are generally dark-colored polymers of relatively high molecular weight. Low molecular weight polymers, e. g. dimers and trimers, which are useful in themselves and whose derivatives, especially the corresponding alcohols, are particularly valuable in the production of resins and drying oils, are more difficult to produce.

An object of the present invention is the polymerization of allyl-type halides. Another object is the production of light-colored dimers and trimers of allyl-type halides. Another object is the production of polymeric allyl-type halides capable of conversion to low molecular weight resin-forming compounds. Another object is the production of dimeric and trimeric allyl-type alcohols. Another object is the production of new synthetic resins. Another object is the production of synthetic drying oils. Other objects will be apparent from the description of the invention given hereinafter.

These objects are accomplished in accordance with the present invention by the polymerization of allyl-type halides with heat in the presence of an alkali metal salt of carbonic acid and by the use of the resulting polymers in the production of resins, drying oils and the like. It has now been found that when allyl-type halides are heated with sodium carbonate or a related compound, light-colored dimeric and trimeric allyl-type halides are produced in good yield. The products are readily converted to dimeric and trimeric allyl-type alcohols, which react with unsaturated monobasic acids, forming synthetic drying oils, and with polybasic acids, forming alkyd-type resins.

Allyl-type halides are compounds of aliphatic character having an unconjugated olefinic double bond between two carbon atoms, one of which is directly attached to a saturated carbon atom which in turn is directly attached to a halogen atom. They have in the molecule the structure

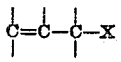

wherein X represents halogen. They are beta-unsaturated halides of aliphatic character. The term "unconjugated," as used herein, refers to absence of conjugation with another unsaturated carbon-to-carbon linkage.

Preferred allyl-type halides have in the molecule but a single olefinic linkage and have the structure

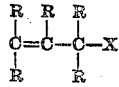

wherein each R represents hydrogen or the same or different halogen or alkyl radical.

Further preferred are allyl-type halides having the structure

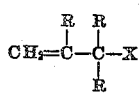

wherein each R represents hydrogen, or the same, or different, halogen or alkyl radical.

Examples of preferred allyl-type halides of the latter formula are allyl chloride, methallyl chloride, chloroallyl chloride, methyl vinyl carbinyl chloride, alpha,alpha'-dimethallyl chloride, and the corresponding bromides, fluorides and iodides. Representative of other preferred allyl-type halides are crotyl chloride, beta-ethyl crotyl chloride, beta-phenyl crotyl chloride and the corresponding bromides, fluorides and iodides. Other operative allyl-type halides are cinnamyl chloride, beta-cyclohexyl allyl chloride, beta-cyclopentyl allyl chloride, beta-phenyl allyl chloride, alpha,alpha'-dicyclohexyl allyl chloride, and the corresponding bromides, fluorides and iodides. By reason of their availability, comparative low cost, ease of handling, ready adaptability to the process of the invention and the desirable nature of their products, allyl halides, methallyl halides and chloroallyl halides are preferred. The compounds can be polymerized alone, or two or more different compounds can be polymerized together.

Any alkali metal salt of carbonic acid can be used to promote the polymerization of allyl-type halides. Sodium, potassium, lithium, rubidium, and cesium carbonates and bicarbonates are effective. Carbonates are more effective than bicarbonates and are preferred for this reason and also because the latter tend to decompose at elevated temperatures with the production of water, which adversely affects the reaction.

Precautions should be taken to carry out the reaction under substantially anhydrous conditions, although traces of water are permitted. Dry ingredients for the reaction mixture should be provided and atmospheric moisture is desirably excluded during the reaction, either by completely sealing the reaction vessel from contact with the atmosphere, or by providing a moisture trap such as a calcium chloride tube.

The reaction can be conducted in apparatus of substantially any common non-reactive material and of any suitable construction. Steel, glass and porcelain are suggested materials. Reflux conditions can be provided. Preferred apparatus, however, is completely sealed from the atmosphere during the reaction and is capable of withstanding the pressures developed at elevated temperatures. In apparatus satisfying these requirements stainless steel is the preferred material. For small scale production a stainless steel bomb is suggested.

The reaction can be carried out over a wide temperature range. It proceeds relatively slowly at 80° C. and even lower. In this range dimeric products predominate. At higher temperatures the reaction is more vigorous and larger amounts of trimers are produced. Temperatures between about 100° C. and about 200° C. are ordinarily preferred, although temperatures as high as 300° C. have been found satisfactory in most instances. In general, the upper limit of temperature is dependent only upon the decomposition and degradation of the allyl-type halide, of its polymers or of the alkali metal compound used as a promoter. Alkali metal bicarbonates decompose at high temperatures with the production of water. When bicarbonates are employed, temperatures sufficient to cause their decomposition are to be avoided.

Superatmospheric pressures are desirable for the reaction and are required where the temperature at which the reaction is conducted approaches, equals or exceeds the boiling point of the allyl-type halide or halides involved. A pressure equal to the combined partial pressures of the constituents in the reaction mixture, which pressure is designated as the "autogenic pressure," is ordinarily sufficient. Such pressure can be generated by conducting the reaction in a sealed vessel, the contents having been introduced and the vessel sealed at about room temperature.

Polymerization of allyl-type halides in accordance with the invention can be carried out in a continuous or batchwise manner. It is sometimes desirable to provide the reactants with a blanket of an inert gas, such as nitrogen or carbon dioxide. The mixture is preferably agitated during the reaction. Although ordinarily unnecessary, solvents and/or other diluents may be present.

The products of the reaction with which the invention is concerned are dimeric and trimeric allyl-type halides. They can be isolated from their mixture with the other ingredients of the reaction mixture by distillation, selective dissolution, etc. A typical procedure consists in filtering, distilling off unreacted allyl-type halide at atmospheric pressure, and finally separating the polymers from the residue by distillation under reduced pressure, which process can be used also to separate dimers from trimers.

Dimeric and trimeric allyl-type halides produced in accordance with the process herein described are normally colorless substances which tend to discolor slightly on prolonged exposure to the atmosphere. The lower members, e. g. dimers and trimers of allyl chloride, are readily mobile liquids. Chemically, they are unsaturated compounds. The dimer of allyl chloride probably has the structure

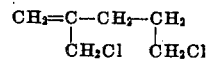

The trimer of ally chloride probably has the structure

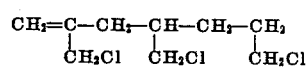

Polymers of other allyl-type halides are presumed to have corresponding structures.

The dimers and trimers of the allyl-type halides are useful without chemical modification. They are, for instance, potent biocides and can be used for killing bacteria, fungi, insects and weeds. They can be used as chemical intermediates. They can be reacted with inorganic polysulfides yielding vulcanizable organic persulfide elastomers. They can be converted to diamines, which are reactable with dicarboxylic acids, forming synthetic linear polyamides comparable to the presently available nylons. By known processes the halogens of the compounds can be replaced by their cyanide groups which are readily converted to carboxy groups. The resulting polycarboxylic acids are useful as resin intermediates, reacting with polyhydric alcohols, such as glycol, diethylene glycol, glycerol, diglycerol, pentaglycerol, pentaerythritol, sorbitol and mannitol to form heat- and oxygen-convertible alkyd-type resins. These acids may also be reacted with diamines to give polyamides of the nylon type. The polymeric halides react with the alkali metal salts of dibasic acids such as phthalic, succinic, glutaric, adipic, etc., acids under the conditions of alkyd resin formation, giving heat- and oxygen-convertible resins.

The dimers and trimers of the allyl-type halides can be converted to the dimers and trimers of the corresponding allyl-type alcohols and, in fact, the invention in one aspect is directed specifically to the production of such alcohols. The halides can be converted to the alcohols in any suitable manner. One method is hydrolysis with an aqueous alcoholic solution of an alkali metal hydroxide. The conversion of allyl-type halides to the corresponding alcohols by hydrolysis with alkali metal hydroxides while the alkalinity of the reaction mixture is maintained in the carbonate-bicarbonate range is described in U. S. Patent 2,318,033, issued May 4, 1943. Dimers and trimers can be converted to the corresponding alcohols also by treatment with an aqueous solution of a cuprous compound.

Dimeric and trimeric allyl-type alcohols produced in accordance with the invention are colorless, viscous, hygroscopic liquids. They can be used as anti-freeze agents and as humectants. They are valuable as vulcanizable plasticizers for elastomers, synthetic resins, natural resins and other plastics. They are intermediates in the synthesis of a large number of chemical compounds.

The unsaturated dimeric and trimeric allyl-type alcohols can be used directly in the production of alkyd-type resins by reaction with polybasic acids. Suitable acids are, for example, succinic, glutaric, adipic, pimelic, suberic, azelaic, sebacic, maleic, fumaric, itaconic, citraconic, malic, tartronic, phthalic, isophthalic, terephthalic, 1,8-napthalenic, citric, aconitic and tricarballylic acids. Instead of the acids, the corresponding chlorides, esters or anhydrides, particularly the latter, can be used. The allyl-type alcohol dimers and trimers can be used alone, or in admixture with one another, or with other polyhydric alcohols, such as glycol, diethylene glycol, triethylene glycol, glycerol, pentaerythritol and the like. Modifiers, such as monobasic acids, monohydric alcohols and oils, may be present during the resin-forming reaction.

The alkyd-type resins of the invention are polymeric condensation products, specifically polyesters. In the production of alkyd resins by the reaction of a polycarboxylic acid and an unsaturated dimer or trimer of an allyl-type alcohol there is generally first formed a fusible resin soluble in common organic solvents. Further reaction converts this resin to a resin which is fusible but insoluble in most organic solvents. The final stage results in an infusible, generally insoluble resin. The first two stages of the reaction are energized principally by heat. Catalysts are ordinarily not required. The final stage, which involves cross-linking and the production of a three-dimensional molecular structure, is assisted by catalysts and promoted by heat. Oxygen, sulfur, finely divided metals, metallic oxides, metallic linoleates, metallic naphthenates, organic peroxides and inorganic peroxides catalyze cross-linking.

Modifying substances not present during the first stage of the reaction in the production of the alkyd resins of the invention can be added during the course of the reaction, or, sometimes, following completion of the reaction. Modifiers other than those previously mentioned include solvents, plasticizers, stabilizers, accelerators, inhibitors, lubricants, dyes, fillers, pigments and plastics of many kinds.

Alkyd-type resins produced by the reaction of polycarboxylic acids with unsaturated dimers and trimers of allyl-type alcohols in accordance with the invention can be used in coating, impregnating, molding and extrusion compositions. They can be used as adhesives and interlayers for laminated articles. They are valuable in substantially all of the applications to which other alkyd resins and modified alkyd resins have been put.

Synthetic drying oils can be produced by reacting one or more drying oil acids with unsaturated dimeric and trimeric allyl-type alcohols. Preferred drying oil acids have at least 16 carbon atoms and have an iodine number (Wijs) of at least 120. Examples of suitable acids are palmitoleic, oleic, linoleic, linolenic, arachidonic, clupanodonic, eleostearic and licanic acids. Other suitable acids can be made by the treatment (isomerization) of acids containing isolated double bonds to bring about conjugation of the double bonds as disclosed by Scheiber in U. S. Patent 1,896,467. Others are made by dehydrating acids containing one or more hydroxyl groups, as exemplified by the dehydration of ricinoleic acid, forming the acid known as 9,11-linoleic acid, octadecadienic acid and ricinic acid. Others result from dehydrogenation of fatty oil acids, the process usually involving in actual practice the introduction of halogen, followed by dehydrohalogenation. Obviously, isomerization, dehydration and dehydrogenation can be effected upon derivatives of the acids, such as the glycerides, rather than upon the acids themselves, followed by the production of the acids from the derivatives. There are many other suitable acids.

The acids from which the drying oils of the invention are produced can be synthesized by known chemical processes. Most of the acids, however, can be obtained more economically from naturally occurring drying oils, which are principally mixtures of glycerides of fatty acids, some of which latter are unsaturated. For example, chia, hempseed, linseed, perilla, safflower, soybean and walnut oils consist of glycerides of oleic, linoleic, linolenic and a small proportion of saturated acids. Fish oils commercially available for use in coating compositions contain glycerides of the above acids and, in addition, of palmitoleic, arachidonic and clupanodonic acids. The glycerides of oiticica oil are those of the valuable, triply conjugated keto acid called licanic acid, in addition to glycerides of oleic and saturated acids. The acid radicals of tung oil are those of saturated acids, oleic acid and the triply conjugated eleostearic acid. In poppyseed and sunflowerseed oils, glycerides of oleic, linoleic and saturated fatty acids are present. Many other oils containing these and other glycerides are known. Examples of other oils are Japanese wood oil, walnut seed oil, rubber seed oil, dehydrated castor oil, etc. In most oils, at least a portion of the glycerides comprises mixed glycerides, in which the molecule contains more than one kind of acid radical.

Among the other natural sources of fatty acids are waxes, which in general are esters of higher fatty acids with monohydric alcohols. Tall oil contains a substantial proportion of unsaturated fatty acids.

The acids can be freed from their compounds with glycerol and other alcohols by any of several known methods, notably by hydrolysis or saponification. Hydrolysis is effected with water under superatmospheric pressures and temperatures. A Twitchell reagent, such as sulfostearic acid, catalyzes hydrolysis at atmospheric pressures. Acids can be used as hydrolyzing agents. Enzymes, such as the lipases, act hydrolytically upon glycerides in aqueous acidic emulsion. The usual method, however, is to saponify the glycerides with a metallic base, such as sodium hydroxide, potassium hydroxide, manganese oxide, zinc oxide, magnesium oxide, ammonia, sodium bisulfite, etc., followed by conversion of the metallic salts of the acids to the free acids themselves. Other catalysts and other processes are known for obtaining acids from esters. The acids are separated from the glycerol and other impurities by known methods. They can be purified by distillation, crystallization, solvent extraction, etc. They can be separated from one another, or used in admixture with one another and/or modified by the addition of other acids.

The synthetic drying oils with which the invention is concerned are esters of unsaturated fatty acids, preferably acids having at least 16 carbon atoms and an iodine number (Wijs) of at least 120, with dimeric and trimeric allyl-type alcohols. Preferred compounds are substantially completely esterified, i. e. the alkyl portion of the ester contains no free hydroxyls.

The synthetic drying oils can be produced by direct esterification, by acid exchange, by ester interchange or by other known processes.

Mixtures of dimers and/or trimers of the same or different allyl-type alcohols can be esterified with mixtures of unsaturated fatty acids, the products being generally both mixtures of esters and mixed esters.

The synthetic drying oils of the invention are normally liquid substances having many of the characteristics of naturally occurring drying oils. In the pure state, they are colorless. They can be bodied by heat and by blowing with an oxygen-containing gas. Bodying, as well as subsequent drying, is promoted by the presence of driers, such as red lead, litharge, manganese oxide, and, preferably, the more readily soluble cobalt, lead, manganese, etc., resinates, linoleates and naphthenates. Oxygen-yielding substances, such as ozone and peroxides hasten bodying and drying.

The drying oils can be used alone or in admixture with one another or with modifying substances. Typical modifiers are solvents, plasticizers, stabilizers, pigments, dyes, other synthetic drying oils, natural drying oils and plastics of many kinds.

Compositions comprising synthetic drying oils produced by the esterification of dimeric and trimeric allyl-type alcohols with higher unsaturated fatty acids can be used in paints, enamels and lacquers for application by any known methods, such as brushing, flowing, doctoring, dipping, etc.

Products of great value can be produced from the saturated compounds corresponding to the unsaturated dimeric and trimeric allyl-type halides, alcohols and derivatives thereof hereinabove referred to.

The dimeric and trimeric allyl-type halides can be saturated by treatment with a halogen or the like under known conditions. A preferred process, however, is hydrogenation. Hydrogenation can be effected by heating with molecular hydrogen under pressure in the presence of a suitable catalyst. The elements of the first and eighth series of the periodic table have been used as catalysts. Platinum black, platinum oxide, colloidal platinum, cadmium, nickel (such as Raney nickel) and copper are frequently used. Because the allyl-type halides tend to quickly kill hydrogenation catalysts, electrolytic hydrogenation is preferred. In electrolytic hydrogenation a solution of the polymer in a solvent conducive to electrolysis is subjected to a direct current which forms nascent hydrogen at the cathode. Preferred electrodes are a revolving silver cathode and a platinum gauze anode, the latter protected by a porous cup.

Hydrogenated dimeric and trimeric allyl-type halides may or may not be completely saturated. In either case they are colorless liquids, readily mobile and capable of distillation under reduced pressure. They can be used as chemical intermediates in much the same way as the unhydrogenated compounds, in accordance with the disclosure hereinbefore. The saturated allyl-type halides can be converted to the corresponding alcohols by refluxing with aqueous alcoholic alkali metal hydroxide, or by heating with a solution of a cuprous compound, preferably in the presence of a metal activator.

The saturated alcohols are, however, more readily produced by the hydrogenation of the unsaturated alcohols, hydrogenation being effected in any of the ways previously recited for the hydrogenation of the halides. Preferred conditions for the hydrogenation of unsaturated dimeric and trimeric allyl-type alcohols are given in our copending application, Serial Number 502,372, filed September 14, 1943.

The saturated dimeric and trimeric allyl-type alcohols are normally colorless, hygroscopic liquids, useful as anti-freeze agents, humectants, plasticizers and the like. They can be used in the production of synthetic drying oils which much resemble those formed from the unsaturated alcohols. The saturated alcohols react with polycarboxylic acids to form alkyd-type resins. In the case of the reaction of a saturated dimer of an allyl-type alcohol with a saturated dibasic acid, such as phthalic acid, the resin is ordinarily not thermosetting but remains permanently fusible. In general, the resins formed from unsaturated dimeric and trimeric allyl-type alcohols and polybasic acids dry more rapidly than those formed from the corresponding saturated alcohols and polybasic acids.

The discovery that dimeric and trimeric allyl-type halides of good quality are produced in good yield when the corresponding monomers are heated in the presence of alkali metal carbonates and bicarbonates opens an entirely new field for research and exploitation. The polymeric halides are of great value in themselves. Their importance as chemical intermediates can hardly be overemphasized.

Some of the most important advantages of the invention reside in the production of the dimeric and trimeric allyl-type alcohols. These compounds are valuable in the production of alkyd-type resins and synthetic drying oils. So far as is known, comparable resins and oils cannot be produced from any other compounds. The higher polymeric allyl-type alcohols are not equivalent.

The following examples in which parts are on a weight basis are given for the purpose of illustrating the invention but are not to be considered limiting thereto.

*Example I*

A mixture of 107 parts of allyl chloride and 53 parts of anhydrous sodium carbonate was maintained for 15 hours at 120° C. in a sealed steel vessel capable of withstanding pressure. The reaction mixture was then filtered and unreacted allyl chloride was removed by distillation at atmospheric pressure. The residue was then subjected to distillation under reduced pressure. The overhead obtained at between 73° C. and 103° C. at 51 to 61 mm. of mercury pressure analyzed as follows:

| | Found | Calculated For Monomer $C_3H_5Cl$ | Calculated For Dimer $C_6H_{10}Cl_2$ | Calculated For Trimer $C_9H_{15}Cl_3$ |
|---|---|---|---|---|
| $n_D^{20}$ | 1.465 | 1.4151 | | |
| Per cent Chlorine (total) | 42.6 | 46.4 | 46.4 | 46.4 |
| Bromine No. g. $Br_2$/100 g | 113 | 209 | 104.5 | 69.8 |

A portion of the overhead was heated with a mixture comprising 17% water, 16% potassium hydroxide and 67% ethyl alcohol for three hours at 100° C. Analysis of the product indicated that hydrolysis to the corresponding alcohols had taken place to the extent of approximately 97.5%. No trace of diallyl carbonate was found.

Example II

A mixture of 140 g. of allyl chloride and 53 g. of anhydrous sodium carbonate was maintained for 16 hours at 160° C. in a steel pressure vessel with continuous vigorous agitation. The contents of the vessel were then filtered. A portion of the filtrate was subjected to distillation at atmospheric pressure to remove unreacted allyl chloride. The distillation was continued under reduced pressure. The fraction (A) boiling between 76° C. and 97° C. at a pressure of 52 mm. of mercury, had a refractive index ($n_D^{20}$) of 1.4691.

Analysis of fraction A indicated it was substantially pure dimeric allyl chloride:

|  | Found | Calcd. for Dimer $C_6H_{10}Cl_2$ |
| --- | --- | --- |
| Molecular weight | 149 | 153 |
| Bromine Number g. Br$_2$/100 g. | 104 | 104.5 |
| Per cent Chlorine (total) | 44.5 | 46.4 |

Another fraction (B) was collected at between 125° C. and 149° C. at 1 to 3 mm. of mercury pressure. The second fraction had a refractive index ($n_D^{20}$) of 1.4969.

Analysis of fraction B indicated it was substantially pure trimeric allyl chloride:

|  | Found | Calcd. for Trimer $C_9H_{15}Cl_3$ |
| --- | --- | --- |
| Molecular weight | 230 | 229.5 |
| Bromine Number g. Br$_2$/100 g. | 75 | 69.8 |
| Per cent Chlorine (total) | 42.7 | 46.4 |

The dimeric and trimeric allyl chlorides could be converted to the corresponding alcohols in accordance with the procedure used in Example I.

Example III 100 parts of a mixture of dimeric and trimeric allyl alcohols obtained in accordance with Example I are heated with 100 parts of phthalic anhydride at 160° C. for an hour and one-half in the presence of nitrogen. The resulting alkyd resin is an amber solid.

Example IV

A mixture of dimeric and trimeric allyl alcohols obtained in accordance with Example I is esterified with linseed fatty acids by heating under reflux conditions. Water and unreacted material is removed by distillation. The product is a synthetic drying oil capable of hardening in the presence of siccatives.

Example V

Substantially pure trimeric allyl alcohol obtained in accordance with Example II is reacted with maleic anhydride by heating under reflux conditions with agitation in an atmosphere of nitrogen. The reaction is carried to a point at which the resin is an organo-soluble solid. The resin is dissolved in acetone, applied as a coating to a metal panel and baked at 100° C.

The same procedure is used in the production of a resin from maleic anhydride and substantially pure dimeric allyl alcohol obtained in accordance with Example II.

Example VI

A mixture of dimeric and trimeric allyl alcohols is hydrogenated by heating with hydrogen under an initial pressure of about 1700 p. s. i. in the presence of a Raney nickel catalyst. A portion of the hydrogenated alcohols is esterified with a mixture of higher unsaturated fatty acids obtained by the hydrolysis of linseed oil. The resulting synthetic drying oil is used in the production of high quality lacquers capable of drying under atmospheric conditions.

Another portion of the hydrogenated alcohols is refluxed with a mixture of cottonseed oil and phthalic anhydride, the proportions of the reactants being 1:1:2, respectively. The resulting alkyd-type resin is used as the basis for baking enamels.

We claim as our invention:

1. A drying oil comprising an unsaturated fatty acid ester of a low molecular weight polymer of a beta-gamma unsaturated alcohol.

2. A synthetic resin comprising a polymeric condensation product of a polycarboxylic acid and a low molecular weight polymer of a beta-gamma unsaturated alcohol.

3. A drying oil comprising an unsaturated fatty acid ester of a low molecular weight hydrogenated polymer of a beta-gamma unsaturated alcohol.

4. A synthetic resin comprising a polymeric condensation product of a polycarboxylic acid and a low molecular weight hydrogenated polymer of a beta-gamma unsaturated alcohol.

5. A process for effecting the polymerization of a beta-gamma olefinic halide of aliphatic character to dimers and trimers thereof which comprises heating the olefinic halide with an alkali metal salt of carbonic acid under substantially anhydrous conditions at a temperature at which polymerization occurs.

6. A process for effecting the polymerization of an aliphatic mono-olefinic beta-gamma unsaturated halide to dimers and trimers thereof which comprises heating the olefinic halide with an alkali metal salt of carbonic acid under substantially anhydrous conditions at a temperature at which polymerization occurs.

7. The process for effecting the polymerization of an aliphatic mono-olefinic beta-gamma unsaturated chloride to dimers and trimers thereof which comprises heating the olefinic halide with an alkali metal salt of carbonic acid under substantially anhydrous conditions at a temperature at which polymerization occurs.

8. A process for effecting the polymerization of allyl chloride to dimers and trimers thereof which comprises heating the olefinic halide with an alkali metal salt of carbonic acid under substantially anhydrous conditions at a temperature at which polymerization occurs.

9. A process for effecting the polymerization of allyl chloride to dimers and trimers thereof which comprises heating allyl chloride with an alkali metal salt of carbonic acid under substantially anhydrous conditions at a temperature between 100° C. and 200° C.

10. A process for the production of dimers and trimers of a beta-gamma olefinic alcohol of aliphatic character which comprises heating a beta-gamma olefinic halide of aliphatic character with an alkali metal salt of carbonic acid under substantially anhydrous conditions to polymerize the unsaturated halide to dimers and trimers thereof, and hydrolyzing the dimeric and trimeric unsaturated halides to the corresponding dimeric and trimeric unsaturated alcohols by heating with water in the presence of a hydrolyzing agent under hydrolyzing conditions.

11. A process for the production of a dimer of an aliphatic mono-olefinic beta-gamma unsaturated alcohol which comprises polymerizing an aliphatic mono-olefinic beta-gamma unsaturated halide to a dimer thereof by heating it with an alkali metal salt of carbonic acid under substantially anhydrous conditions, and hydrolyzing the dimeric unsaturated halide to the corresponding dimeric unsaturated alcohol by heating it with water in the presence of an alkali metal hydroxide under hydrolyzing conditions.

12. A process for the production of a trimer of an aliphatic mono-olefinic beta-gamma unsaturated alcohol which comprises polymerizing an aliphatic mono-olefinic beta-gamma unsaturated halide to a trimer thereof by heating it with an alkali metal salt of carbonic acid under substantially anhydrous conditions, and hydrolyzing the trimeric unsaturated halide to the corresponding trimeric unsaturated alcohol by heating it with water in the presence of an alkali metal hydroxide under hydrolyzing conditions.

13. A process for the production of dimeric allyl alcohol which comprises polymerizing allyl chloride to dimeric allyl chloride by heating it with an alkali metal salt of carbonic acid under substantially anhydrous conditions, and hydrolyzing the dimeric allyl chloride to dimeric allyl alcohol by heating it with water in the presence of an alkali metal hydroxide under hydrolyzing conditions.

14. A process for the production of trimeric allyl alcohol which comprises polymerizing allyl chloride to trimeric allyl chloride by heating it with an alkali metal salt of carbonic acid under substantially anhydrous conditions, and hydrolyzing the trimeric allyl chloride to trimeric allyl alcohol by heating it with water in the presence of an alkali metal hydroxide under hydrolyzing conditions.

DAVID E. ADELSON.
HAROLD F. GRAY, Jr.

REFERENCES CITED

The following references are of record in the file of this patent:

UNITED STATES PATENTS

| Number | Name | Date |
| --- | --- | --- |
| 2,338,297 | Mugdan et al. | Jan. 4, 1944 |
| 2,318,032 | Grundt et al. | May 4, 1943 |
| 1,489,744 | Downs et al. | Apr. 8, 1924 |
| 2,197,813 | Strauss | Apr. 23, 1940 |
| 1,998,309 | Clark et al. | Apr. 16, 1935 |
| 2,072,016 | Tamele et al. | Feb. 23, 1937 |
| 2,331,869 | Adelson | Oct. 12, 1943 |
| 2,332,460 | Muskat et al. | Oct. 19, 1943 |
| 2,338,893 | Bauer et al. | Jan. 11, 1944 |